US012478162B2

(12) United States Patent
Kim et al.

(10) Patent No.: US 12,478,162 B2
(45) Date of Patent: Nov. 25, 2025

(54) REUSABLE NAIL TIP

(71) Applicant: MEMUSE CO., LTD., Seoul (KR)

(72) Inventors: Soo Jung Kim, Hanam-si (KR); Jae Woo Lee, Hanam-si (KR)

(73) Assignee: MEMUSE CO., LTD., Seoul (KR)

( * ) Notice: Subject to any disclaimer, the term of this patent is extended or adjusted under 35 U.S.C. 154(b) by 0 days.

(21) Appl. No.: 17/921,261

(22) PCT Filed: Sep. 2, 2022

(86) PCT No.: PCT/KR2022/013174
§ 371 (c)(1),
(2) Date: Oct. 25, 2022

(87) PCT Pub. No.: WO2023/158042
PCT Pub. Date: Aug. 24, 2023

(65) Prior Publication Data

US 2024/0215700 A1 Jul. 4, 2024

(30) Foreign Application Priority Data

Feb. 17, 2022 (KR) ........................ 10-2022-0020695

(51) Int. Cl.
*C09J 125/10* (2006.01)
*A45D 29/00* (2006.01)
*A45D 31/00* (2006.01)
*C09J 11/04* (2006.01)

(52) U.S. Cl.
CPC ........... *A45D 31/00* (2013.01); *A45D 29/001* (2013.01); *C09J 11/04* (2013.01); *C09J 125/10* (2013.01); *C09J 2425/00* (2013.01); *C09J 2475/006* (2013.01)

(58) Field of Classification Search
CPC ....... A45D 31/00; A45D 29/001; C09J 11/04; C09J 125/10; C09J 2425/00; C09J 2475/006; C09J 153/02; C08K 2003/2296
See application file for complete search history.

(56) References Cited

U.S. PATENT DOCUMENTS

2019/0031829 A1* 1/2019 Ni ........................... C08L 75/08
2021/0299005 A1* 9/2021 Ozawa ................... A61K 8/046

FOREIGN PATENT DOCUMENTS

| | | | | |
|---|---|---|---|---|
| CN | 1903160 | A | * | 1/2007 |
| JP | 2019-1924 | A | | 1/2019 |
| JP | 2020-26398 | A | | 2/2020 |
| KR | 101359621 | B1 | * | 2/2014 |
| KR | 10-2018-0124843 | A | | 11/2018 |
| KR | 10-2021-0156947 | A | | 12/2021 |
| KR | 10-2428424 | B1 | | 8/2022 |
| WO | 2010/053232 | A1 | | 5/2010 |

OTHER PUBLICATIONS

Japanese Office Action mailed Mar. 26, 2024 issued in Japanese Patent Application No. 2022-565713.
Satoshi Ozawa et al., "Method for producing coating film", Kao Corporation, Aug. 8, 2019.
Korean Office Action for KR 10-2022-0020695 dated Mar. 4, 2022.
Korean Notice of Allowance for KR 10-2022-0020695 dated Jul. 21, 2022.
International Search Report dated Dec. 7, 2022 issued by the International Search Authority in Application No. PCT/KR2022/013174.
Written Opinion dated Dec. 7, 2022 issued by the International Search Authority in Application No. PCT/KR2022/013174.

* cited by examiner

*Primary Examiner* — Kumar R Bhushan
(74) *Attorney, Agent, or Firm* — Sughrue Mion, PLLC

(57) ABSTRACT

The present invention relates to a reusable nail tip, and more particularly, to a nail tip that can be easily attached to a nail, used for a predetermined period of time, removed and reused again.

The nail tip of the present invention adopts a TPU material with desirable elasticity to thus attain convenience of use and excellent retention, and uses an adhesive composition that includes various antibacterial and moisture components, thereby minimizing side effects and nail damage.

4 Claims, No Drawings

REUSABLE NAIL TIP

This application is a National Stage of International Application No. PCT/KR2020/013174 filed Sep. 2, 2022, claiming priority based on Korean Patent Application No. 10-2022-0020695 filed Feb. 17, 2022, the entire disclosures of which are incorporated herein by reference.

FIELD OF INVENTION

The present invention relates to a reusable nail tip, and more particularly, to a nail tip that can be easily attached to a nail, used for a certain period, removed and reused again.

BACKGROUND OF INVENTION

The global market for nail products is growing every year, and in Korea, the average annual growth rate of the market for nail products was 19.2%, ranking fourth among cosmetics. Nail products are expected to continue to increase in response to the aesthetic needs of consumers. In the field of nail art, nail care, to high-level designs, sophisticated colors, and various works including enhancement of individuality by selecting high-level designs, elegant colors and different nail shapes, active utilization of nails as a means of aesthetic expression to extend the length of nails, and to implement various shapes, drawings, three-dimensional expressions, etc. are being performed. Specific methods include attaching artificial nails, using a cloth, length extension, using acrylic powder or liquid, and the like.

On the other hand, nail tips are one of the nail art methods, which attaches artificial nails to match a size of one's nails in order to improve the aesthetic appearance of the hands. In particular, this has risen in popularity in line with the recent trend of un-contact consumption due to COVID-19. In the case of nail tips, the price is low and attaching one nail tip takes only about 10 seconds, therefore, it is very simple and easy to use the nail tips. Further, diverse designs of nail tips have been launched, thereby having an advantage of a wide range of design selection. In addition, since self-nail care is possible, there is less concern about hygiene. As such, although nail tips have many advantages, a feeling at first use may be inconvenient depending on raw materials of a nail body. Further, since the nail tip is attached on a nail by a binder (or adhesive), infectious skin diseases, nail injury, etc. may occur according to methods of using the same.

Under such backgrounds as described above, the present inventors have developed a reusable nail tip capable of being reused multiple times, which includes a nail body material with excellent usability and retention and antibacterial and moisture ingredients as an adhesive layer so as to minimize nail damage and side effects when using the nail tips, therefore, have completed the present invention.

SUMMARY OF INVENTION

Technical Problem to be Solved

One object of the present invention is to provide a nail tip, which includes a nail body; a design layer formed on the nail body; and an adhesive layer formed under the nail body, wherein the nail body is a thermoplastic polyurethane (TPU) composite, while the adhesive layer includes an adhesive composition comprising a styrene-isoprene-styrene (SIS) copolymer, propylene glycol, polyisobutene, carboxymethyl cellulose (CMC), silica and zeolite.

Technical Solution

One aspect of the present invention for achieving the above object is the provision of a nail tip, which includes a nail body; a design layer formed on the nail body; and an adhesive layer formed under the nail body, wherein the nail body is a thermoplastic polyurethane (TPU) composite, while the adhesive layer includes an adhesive composition comprising a styrene-isoprene-styrene (SIS) copolymer, propylene glycol, polyisobutene, carboxymethyl cellulose (CMC), silica and zeolite.

The "nail tip" of the present invention may include: a nail body; a design layer formed on top of the nail body; and an adhesive layer formed under the nail body. Since the nail top is used by directly attaching the same to a natural nail, it must be adhered to the nail without lifting and, when removed, must come off easily without damaging the nail surface.

The design layer is formed of a polypropylene (PP) film, and may include general patterns, designs, colors, patterns and decorations made of materials imparting aesthetic effects such as designs, glitter and confetti.

The adhesive layer may be formed of an adhesive composition, and the adhesive composition may include a styrene-isoprene-styrene (SIS) copolymer, propylene glycol, polyisobutene, carboxymethyl cellulose (CMC), silica and zeolite. The adhesive composition may include specifically 25 to 35 parts by weight ("wt. parts") of a styrene-isoprene-styrene (SIS) copolymer, 15 to 25 wt. parts of propylene glycol, 10 to 20 wt. parts of polyisobutene, 5 to 15 wt. parts of carboxymethyl cellulose (CMC), 0.1 to 1 wt. part of silica, and 0.1 to 3 wt. parts of zeolite.

The styrene-isoprene-styrene (SIS) copolymer, propylene glycol, polyisobutene, carboxymethyl cellulose (CMC), silica and zeolite in the present invention may be directly synthesized and used, or purchased and used among commercially available products, and the like, therefore, methods for obtaining the same are not particularly limited.

The adhesive layer of the present invention may be manufactured in a hot-melt type. Since the hot-melt type adhesive is a solvent-free type and does not use a solvent harmful to the human body, it can be used safely without affecting the environment. Specifically, the adhesive layer may be formed according to the following process in that: 30 wt. parts of a styrene-isoprene-styrene (SIS) is put into an agitator heated in the range of 150 to 160° C. and mixed until coarse particles appear; 15 wt. parts of polyisobutene is added and mixed for 5 to 15 minutes to become homogeneous; after reducing the temperature to 100-110° C., 20 wt parts of propylene glycol, 0.5 wt. parts of silica and 1 wt. part of zeolite are added and mixed, and, finally, 10 wt. parts of carboxymethyl cellulose (CMC) is added and stirred to be completely dissolved, followed by applying and drying the final product.

The adhesive composition of the present invention is characterized in that it exhibits antibacterial and antifungal activity, and specifically, may express antibacterial and antifungal activity against *Pseudomonas aeruginosa* and *Candida albicans* strains, but is not particularly limited thereto.

In a specific embodiment of the present invention, with regard to the nail tip having an adhesive layer prepared by the above method in Example 1, the nail tip having an adhesive layer without propylene glycol in Comparative Example 1, the nail tip not containing zeolite in Comparative Example 2, and the nail tip prepared using an acryl adhesive commercially available in the market as the adhesive in Comparative Example 3, antibacterial and antifungal activity were compared and assessed (Experimental Example 1). As a result, it was confirmed that the adhesive composition of Example 1 the most excellent has antibacterial and antifungal activity against *P. aeruginosa* and *Candida* bacteria. On the other hand, the composition of Comparative Example 1 or Comparative Example 2 that do not contain propylene glycol or zeolite show somewhat lower antibacterial and antifungal activity, while general and commercially available acrylic adhesives have almost no antibacterial and antifungal activity. That is, it could be found that the adhesive composition of the present invention is included in an adhesive layer in direct contact with the nail, which in turn exhibits excellent inhibitory activity against *P. aeruginosa* or *Candida* bacteria that may cause infectious skin diseases.

In another specific embodiment of the present invention, the nail tips Examples and Comparative Examples were directly attached and used, and subjective preference for moisture and nutrition after removal of the nail tips was compared and assessed (Experimental Example 2). As a result, it was confirmed that the nail tip of Comparative Example 1 using the adhesive composition not containing propylene glycol and the nail tip of Comparative Example 3 using a general acrylic adhesive have undesirable moisturizing effects compared to the nail tip of Example 1. That is, it could be found that the adhesive composition of the present invention may minimize nail damage when using a nail tip because propylene glycol as a moisture component is additionally included.

A reusable nail tip is a product that may be removed after simply attaching the tip to a nail and using it for a predetermined period of time, and then, can be reused by applying an adhesive thereto. Therefore, if the nail body is too hard or has no elasticity, it is difficult to adhere the nail tip to the nail. As a result, a retention force to maintain the nail tip to be attached to the nail may be reduced or wearing comfort may be deteriorated. That is, it is important to use a nail body material with good elasticity.

The nail body is a thermoplastic polyurethane (TPU) composite, wherein the thermoplastic polyurethane composite is a product of thermoplastic polyurethane with zinc oxide (ZnO) introduced therein. Specifically, the thermoplastic polyurethane composite may be manufactured by introducing 0.5 wt. parts of zinc oxide (ZnO) and 15 wt. parts of 1,4-butane-diol to 135 wt. parts of thermoplastic polyurethane (TPU), mixing the same at 160° C. for 10 minutes using HAAKE rheocord to prepare a thermoplastic polyurethane composite, followed by an injection process at an injection temperature of 160 to 180° C.

The thermoplastic polyurethane composite of the present invention may include zinc oxide to thus improve physical properties of thermoplastic polyurethane and may exhibit antibacterial activity.

In a specific embodiment of the present invention, as a result of comparison and assessment of feeling of touch ("touch feeling") between the nail tip of Example 1 using TPU composite and the nail tip of Comparative Example 4 using ABS (Acrylonitrile-Butadiene-Styrene) resin as a material of the nail body (Experimental Example) 2), it was found that the nail tip of Comparative Example 4 has almost no elasticity and while feeling hard, whereby convenience during use and the touch feeling while attached are negative.

In another specific embodiment of the present invention, as a result of comparing the resilience of the nail tips between Example 1 and Comparative Example 4 (Experimental Example 3), an elastic modulus of the nail tip was significantly higher than that of the nail tip of Comparative Example 4, therefore, it can be predicted that the nail tip of the present invention is in close contact with the nail without lifting because of using a flexible TPU material, thereby accomplishing excellent touch feeling as well as a retention force.

Effect of Invention

The nail tip of the present invention achieves comfortable use and excellent retention because a TPU material with good elasticity is used, and can minimize adverse reaction and nail damage using an adhesive composition that includes various antibacterial and moisture components.

BEST MODE FOR CARRYING OUT EMBODIMENTS OF INVENTION

Hereinafter, the present invention will be described in more detail by means of examples. However, these examples are for illustrative purposes only and the scope of the present invention is not limited to these examples.

Preparative Example 1. Production of Reusable Nail Tips

Preparative Example 1-1. Preparation of Nail Tips of Example 1

The adhesive layer of the nail tip of the present invention was prepared in a hot-melt type. Specifically, 30 wt. parts of a styrene-isoprene-styrene (SIS) copolymer is put into an agitator heated to 150-160° C. and mixed until coarse particles are visible. Thereafter, 15 wt. parts of polyisobutene was added and mixed for 5 to 15 minutes until a uniform mixture was obtained and, after reducing the temperature to 100-110° C., 20 wt. parts of propylene glycol, 0.5 wt. parts of silica and 1 wt. part of zeolite were added and mixed. Finally, 10 wt. parts of carboxymethyl cellulose (CMC) was added and agitated until it was completely dissolved, thereby preparing an adhesive composition.

Next, a nail body of the nail tip of the present invention was formed using a thermoplastic polyurethane composite. Specifically, after adding 0.5 wt. parts of zinc oxide (ZnO) and 15 wt. parts of 1.4-butane-diol to 135 wt. parts of thermoplastic polyurethane (TPU), this was mixed at 160° C. for 10 minutes using a HAAKE rheocord to prepare the thermoplastic polyurethane composite, followed by an injection process at an injection temperature of 160 to 180° C., thereby preparing a nail body specimen.

Following this, the adhesive composition was applied to a lower end of the nail body to a thickness of 300 to 350 μm and dried to form an adhesive layer, thereby completing the nail tip of Example 1.

Preparative Example 1-2. Preparation of Nail Tips of Comparative Example 1

After preparing the adhesive composition except for propylene glycol among the components of the adhesive composition of Preparative Example 1-1, a nail tip of Comparative Example 1 was prepared in the same manner as the nail tip of Example 1.

Preparative Example 1-3. Preparation of Nail Tips of Comparative Example 2

After preparing an adhesive composition except for zeolite among the components of the adhesive composition of Preparative Example 1-1, a nail tip of Comparative Example 2 was prepared in the same manner as the nail tip of Example 1.

Preparative Example 1-4. Preparation of Nail Tips of Comparative Example 3

A nail tip Comparative Example 3 was prepared in the same manner as the nail tip of Example 1 except that, instead of the adhesive composition of Preparative Example 1-1, an acrylic adhesive, which is generally used for artificial nails and commercially available in the market, was used as a material for the adhesive layer.

Preparative Example 1-5. Preparation of Nail Tips of Comparative Example 4

A nail tip Comparative Example 4 was prepared in the same manner as the nail tip of Example 1 except that, instead of the thermoplastic polyurethane composite of Preparative Example 1-1, an acrylonitrile-butadiene-styrene (ABC) resin, which is generally used for artificial nails, was used as a material of the nail body.

The components and materials of the nail tips of Example 1 and Comparative Example 1-4 are summarized in Table 1 below.

TABLE 1

| Configuration | | Example 1 | Comparative Example 1 | Comparative Example 2 | Comparative Example 3 | Comparative Example 4 |
|---|---|---|---|---|---|---|
| Adhesive composition | SIS copolymer | 30 | 30 | 30 | Commercially available adhesive | 20 |
| | Propylene glycol | 20 | 20 | — | | 35 |
| | Polyisobutene | 15 | 15 | 15 | | 15 |
| | CMC | 10 | 10 | 10 | | 10 |
| | Silica | 0.5 | 0.5 | 0.5 | | 0.5 |
| | Zeolite | 1 | — | 1 | | 1 |
| Nail body | | Thermoplastic polyurethane composite | | | | ABS |

Experimental Example 1. Assessment of Antibacterial and Antifungal Activity of Adhesive Composition In the case of nail tips used on nails, a humid environment such as no compliance with the recommended period of use or prolonged exposure to water may cause an increase in the growth of bacteria or mold as a gap is widened between the nail and the nail tip, therefore, Infectious skin disease may occur. Accordingly, the antibacterial and antifungal activity of the adhesive compositions of Example 1 and Comparative Examples 1-3 were assessed.

Specifically, each composition against *Pseudomonas aeruginosa*, which is the most representative bacterium causing dermatitis on nails, and *Candida albicans* as a fungus, was subjected to MIC measurement using a standard broth serial dilution method. Each composition was diluted in distilled water and used.

TABLE 2

| | MIC (μg/ml) | |
|---|---|---|
| | *P. aeruginosa* | *C. albicans* |
| Example 1 | 3.1 | 7.8 |
| Comparative Example 1 | 6.2 | 15.6 |
| Comparative Example 2 | 50 | 250 |
| Comparative Example 3 | >200 | >1000 |

As a result, as shown in Table 2, it was confirmed that the adhesive composition of Example 1 has the most excellent antibacterial and antifungal activity against *P. aeruginosa* and *Candida*. On the other hand, the composition of Comparative Example 1 or Comparative Example 2 that does not contain propylene glycol or zeolite has somewhat lower antibacterial and antifungal activity, and the commercially available general acrylic adhesive has almost no antibacterial and antifungal activity. That is, it could be seen that the adhesive composition of the present invention included in the adhesive layer in direct contact with the nail exhibits excellent inhibitory activity against *P. aeruginosa* or *Candida*, which may cause infectious skin diseases.

Experimental Example 2. Assessment of Touch Feeling of Nail Tips

In order to confirm subjective satisfaction of using the nail tips of the examples and comparative examples directly, a comparative evaluation was conducted on 20 adult women. Specifically, the nail tips of Example 1 and Comparative Examples 1-4 were attached to the nails, respectively and removed after 5 days, followed by subjective assessment in regard to the convenience of use, touch feeling while being attached, and moisturizing and nourishing feelings after removal. For the rating, a 9-point rating method was used. It was determined such that the higher the preference/satisfaction, the higher the score.

TABLE 3

| | Example 1 | Comparative Example 1 | Comparative Example 2 | Comparative Example 3 | Comparative Example 4 |
|---|---|---|---|---|---|
| Convenience | 7.8 | 7.8 | 7.7 | 6.9 | 6.1 |
| Touch feel | 7.6 | 7.1 | 7.2 | 7.1 | 5.7 |
| Moisture feel | 8.2 | 6.3 | 6.9 | 4.4 | 8.0 |

As a result, as shown in Table 3, it was confirmed that the nail tip of Example 1 has high subjective satisfaction in all items including the convenience of use, touch feeling while being attached, and moisturizing and nourishing feelings after removal. Specifically, in the case of the nail tips of Example 1 and Comparative Example 1 using the adhesive composition which includes SIS copolymer, propylene glycol, polyisobutene, carboxymethyl cellulose (CMC), silica and zeolite, the moisturizing feeling after removal was assessed to be excellent, therefore, it could be confirmed that the adhesive composition of the present invention can minimized nail damage in using artificial nails. On the other hand, the nail tip of Comparative Example 1 using an adhesive composition not containing propylene glycol and the nail tip of Comparative Example 3 using a general acryl adhesive, respectively, have somewhat lower assessment of moisturizing feeling. Further, in the case of the nail tip of Comparative Example 4 using ABS instead of TPU of the present invention as a material of the nail body, the nail tip had a hard feeling with little elasticity, therefore, touch feeling while being attached as well as the convenience during use were negatively demonstrated. That is, it could be seen that the nail tip of the present invention includes an adhesive layer capable of providing moisture and nutrition to the nail, and the nail body is a soft TPU material so that the subjective touch feeling is excellent.

Experimental Example 3. Evaluation of Physical Properties of Nail Tips

The reusable nail tips are a reusable product that may be used by simply attaching them to the nails for a predetermined period of time, removed, and then, reused by attaching an adhesive thereto again. Therefore, if the nail body is hard or has no elasticity, it is hardly in close contact with the nail, which in turn may decrease a retention force allowing the nail body to be attached to the nail or reduce wearing comfort. Accordingly, the nail tip of Example 1 and the nail tip of Comparative Example 4, which use different materials from each other, were subjected to comparison of resilience of the nail tips. Specifically, using a ball rebound elasticity tester (Hildebrand Ball Rebound Tester), the nail tips were measured three times according to ASTM D3574-17 standard, and then averaged.

TABLE 4

| | Example 1 | Comparative Example 1 |
|---|---|---|
| Rebound elasticity (%) | 39.8 | 5.6 |

As a result, as shown in Table 4, the rebound value of the nail tip of Example 1 using the TPU composite as the nail body material was significantly higher than the nail tip of Comparative Example 4 using acrylonitrile-butadiene-styrene (ABS) resin, which is generally used for artificial nails. This means that the nail tip of Example 1 has a remarkably excellent elastic modulus. In other words, the nail tip of the present invention has a desirable elastic modulus and exhibits soft property that allows restoration to its original state even when wrinkled and unfolded. Therefore, the nail tip of the present invention may be in close contact with the nail to attain excellent touch feelings and retention. In addition, since an adhesive layer having antifungal and moisturizing activity is included, it is possible to prevent side effects and nail damage when using the nail tips.

From the above description, those skilled in the art to which the present invention pertains will understand that the present invention may be embodied in other specific forms without changing the technical spirit or essential characteristics thereof. In this regard, it should be understood that the embodiments described above are illustrative in all respects and not restrictive. With regard to the scope of the present invention, it should be construed that, rather than the above detailed description, all changes or modifications derived from the meaning and scope of the claims described below and their equivalents are being included in the scope of the present invention.

The invention claimed is:

1. A nail tip, comprising:

a nail body;

a design layer formed on the nail body; and an adhesive layer formed under the nail body, wherein the nail body is a thermoplastic polyurethane (TPU) composite, while the adhesive layer includes an adhesive composition comprising a styrene-isoprene-styrene (SIS) copolymer, propylene glycol, polyisobutene, carboxymethyl cellulose (CMC), silica and zeolite, wherein the adhesive composition comprises 25 to 35 parts by weight ("wt. parts") of styrene-isoprene-styrene (SIS) copolymer, 15 to 25 wt. parts of propylene glycol, 10 to 20 wt. parts of polyisobutene, 5 to 15 wt. parts of carboxymethyl cellulose, 0.1 to 1 wt. part of silica, and 0.1 to 3 wt. parts of zeolite.

2. The nail tip according to claim 1, wherein the thermoplastic polyurethane composite is formed by introducing zinc oxide (ZnO) into thermoplastic polyurethane.

3. The nail tip according to claim 1, wherein the adhesive composition exhibits antibacterial and antifungal activity.

4. The nail tip according to claim 1, wherein the design layer is formed of polypropylene (PP) film.

* * * * *